3,718,505
SODIUM-SULFUR BATTERY HAVING ALUMINUM
  SULFIDE OR ALUMINUM POLYSULFIDE IN THE
  ELECTROLYTE
John J. Werth, Princeton, N.J., assignor to
  ESB Incorporated
Filed Dec. 7, 1971, Ser. No. 205,560
Int. Cl. H01m 35/02
U.S. Cl. 136—6      7 Claims

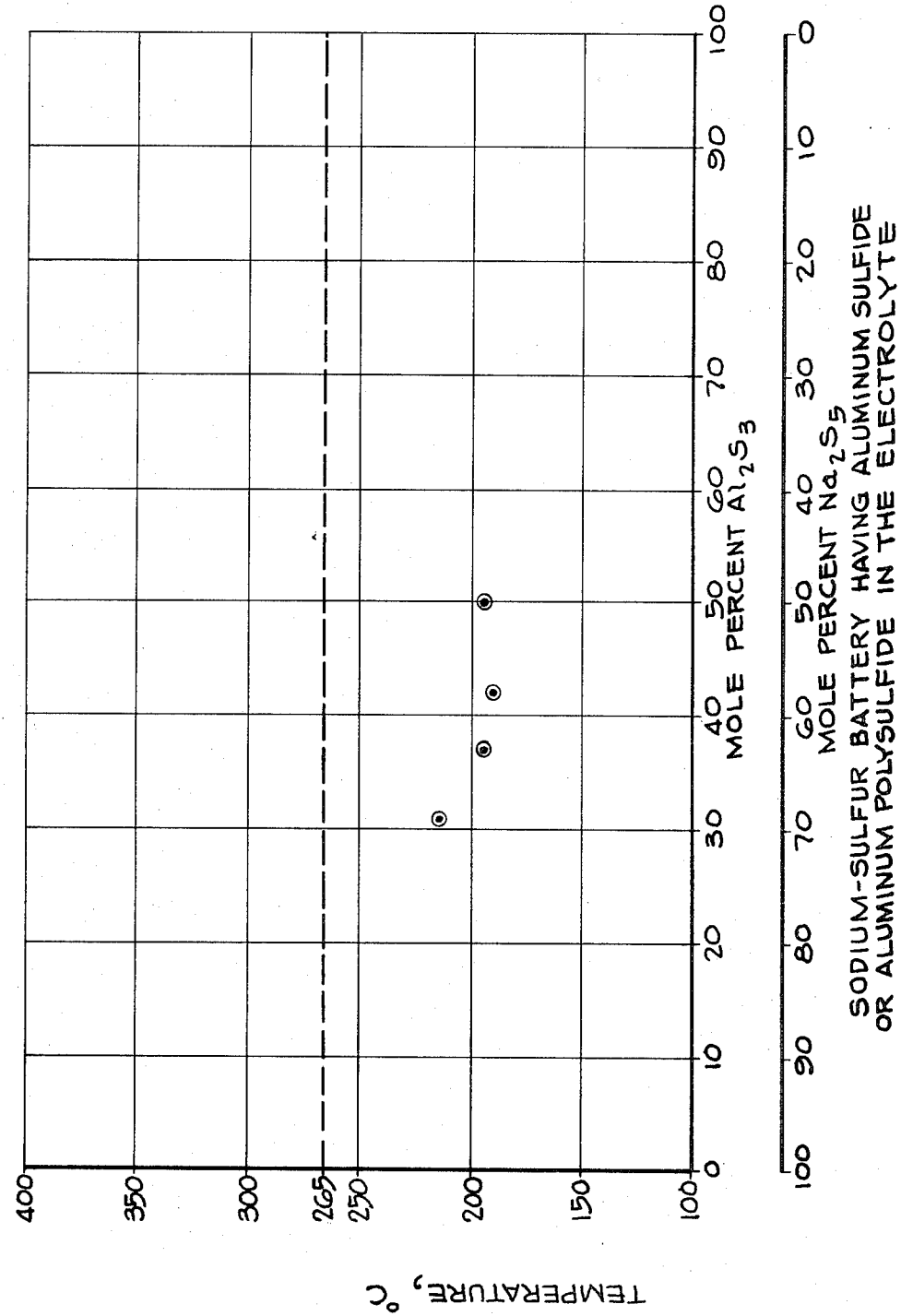

ABSTRACT OF THE DISCLOSURE

A reduced operating temperature for a sodium-sulfur battery is achieved with a new electrolyte comprising sodium polysulfide, aluminum sulfide or aluminum polysulfide, and free sulfur when the electrodes are in the charged condition. The electrolyte, which has a melting point in the range of approximately 200° C., permits the battery to be sealed with polytetrafluoroethylene sealing materials. Based on presently limited data, it appears that the reduced melting point temperature of the electrolyte can be obtained with solutions in which the ratio of the mole percent of sodium polysulfide to the mole percent of aluminum sulfide or aluminum polysulfide varies considerably.

BACKGROUND OF THE INVENTION

United States Pat. No. 3,404,035 discloses a rechargeable battery having a molten sodium anode, a molten sulfur cathode, a solid electrolyte of beta alumina or its derivative situated between the anode and cathode, and an additional electrolyte comprising a sodium polysulfide on the cathode side of the beta alumina. It is well known that this battery cannot run below about 265° C. because the sodium polysulfide, which must be in the molten condition in order for the battery to operate, melts at around that temperature. It is also well known that when running at 265° C. or above, this battery has very severe sealing problems which prevent the use of many common sealing materials composed of polytetrafluoroethylene. In addition, the life of the battery is seriously limited because of the rapid corrosion which occurs at temperatures of 265° C. or above.

It is recognized that if the operating temperature of the sodium-sulfur battery can be reduced to a level (e.g., not exceeding 220° C.) below the upper operating temperatures of the commonly available polytetrafluoroethylene sealing materials, then not only would sealing problems and associated costs be substantially reduced but the operating life of the battery would be greatly increased.

SUMMARY OF THE INVENTION

This invention provides a new electrolyte which permits a substantial reduction in the operating temperature of a sodium-sulfur battery.

The new electrolyte comprises sodium polysulfide, an additional material selected from the group consisting of sulfides and polysulfides the cations of which do not exchange with soduim ions in a solid member, and free sulfur when the anode and cathode are in the charged condition. Preferably, the additional material having the required cations is aluminum sulfide or aluminum polysulfide.

On the basis of presently limited data, it appears that the reduced melting point temperature of the electrolyte can be obtained with solutions in which the ratio of the mole percent of sodium polysulfide to the mole percent of aluminum sulfide or aluminum polysulfide varies considerably.

The invention permits the battery to be sealed with polytetrafluoroethylene sealing materials, with the composition of the electrolyte being adjusted so that the electrolyte has a melting point which is lower than the upper operating temperature of the polytetrafluoroethylene. Preferably the composition is adjusted so that the melting point of the electrosyte does not exceed about 200° C.

BRIEF DESCRIPTION OF THE DRAWINGS

The drawing shows the relationship between the temperature at which the electrolyte of this invention melts and the mole percentages of sodium polysulfide and aluminum sulfide or aluminum polysulfide present in the electrolyte.

DESCRIPTION OF THE PREFERRED EMBODIMENTS

This invention provides a new electrolyte which permits a substantial reduction in the operating temperature of a sodium-sulfur battery. The new electrolyte comprises sodium polysulfide, an additional material selected from the group consisting of sulfides and polysulfides the cations of which do not exchange with sodium ions in a solid member, and free sulfur when the anode and cathode are in the charged condition. Materials having the required cations include the sulfides and polysulfides of aluminum, scandium, gallium, indium, bismuth, boron and possibly some of the rare earth metals, with the sulfides and polysulfides of aluminum being greatly preferred because of cost considerations and other reasons.

The exact composition and structure of the perferred aluminum sulfide or aluminum polysulfide is not yet known, but the compound may be designated simply as $Al_xS_y$. On a laboratory scale the $Al_xS_y$ may be obtained by the reaction, $zAl_2S_3 + Na_2S + wS \rightarrow Na_2S_5 + vAl_xS_y$. A more economical commercial process could utilize the reactions

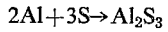
$$2Al + 3S \rightarrow Al_2S_3$$
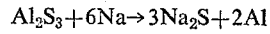
$$Al_2S_3 + 6Na \rightarrow 3Na_2S + 2Al$$
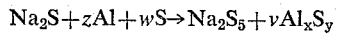
$$Na_2S + zAl + wS \rightarrow Na_2S_5 + vAl_xS_y$$

Whatever its true composition and structure may be, the $Al_xS_y$ results from reactions in the presence of free sulfur between $Na_2S$ and aluminum or its compound with sulfur.

The amount of free sulfur present in the electrolyte is not believed to be critical. In the normal operation of the sodium-sulfur battery, free sulfur is always present in the electrolyte, except for the theoretical possibility that there is no free sulfur when the electrodes are in the fully discharged condition. Hence it is appropriate to state that free sulfur is present in the electrolyte when the anode and cathode are in the charged condition.

On the basis of the limited data presently available it appears that, compared to the conventional sodium polysulfide liquid electrolyte which has been used in the sodium-sulfur battery, the electrolyte comprising a solution of sodium polysulfide with aluminum slfide or aluminum polysulfide has a sbstantially lower melting point. It further appears, based on the limited data presently available, that the reduced melting point temperatures can be obtained from solutions in which the ratio of the mole percent of sodium polysulfide to the percent of aluminum sulfide or aluminum polysulfide varies considerably. The data in support of these statements is tabulated in Table 1 and is presented visually in the drawing.

TABLE 1

| Mole percents | | Observed melting point, °C.[1] |
|---|---|---|
| $Na_2S_5$ | $Al_xS_y$ as $Al_2S_3$ | |
| 69 | 31 | 215 |
| 63 | 37 | 195 |
| 58 | 42 | 190 |
| 50 | 50 | 195 |

[1] Reading from thermocouple.

The reported melting points shown in Table 1 and the drawing are observed readings taken from a thermocouple situated in the electrolyte. Due to the temperature lag inherent in a thermocouple, it is estmiated that the true temperatures in the electrolyte were higher by as much as perhaps 10° C. than the observed readings.

From the data it is apparent that the new electrolyte of this invention permits the sodium-sulfur-battery to be sealed with many commonly available polytetrafluoroethylene sealing materials which have not been feasible in previous sodium-sulfur batteries because of the high operating temperatures which were involved. The upper operating temperatures of the more common polytetrafluoroethylene sealing materials are presented in Table 2.

TABLE 2

| Type of polytetrafluoroethylene: | Upper operating temperature, °C. |
|---|---|
| Du Pont "TFE" | 250 |
| Du Pont "FEP" | 200 |

In view of the upper operating temperatures of the sealing materials presented in Table 2, it is preferred to adjust the proportion of sodium sulfide to aluminum sulfide in the electrolyte so that the electrolyte has a melting point which does not exceed about 200° C.

The reduction in the operating tempertures is expected to increase the operating life of the sodium-sulfur battery by very substantial amounts. One of the very serious limitations of previous sodium-sulfur batteries has been relatively short operating life which resulted from rapid corrosion of metal seals due to the necessarily high operating temperatures. It is well known that corrosion increases very rapidly with increases in temperature at elevated temperatures (the increase in corrosion rates may be exponential or logarithmic, but is not linear), and a reduction in the operating temperature of the battery may be expected to greatly increase the operating life of the battery.

As is conventional in sodium-sulfur batteries, the battery of this invention wil have a solid member separating the anode and the cathode, which member is capable of transmitting sodium ions. Such members are commonly made from beta alumina or its derivative at the present time. It is an important feature of this invention that the new electrolyte is compatible with the ion exchange member, i.e., the cations in the sulfide or polysulfide additive to the sodium polysulfide must be ones which do not exchange with sodium ions in the ion exchange member. Since aluminum ions have almost no equilibrium concentration in the open sodium-ion-containing planes of beta alumina, these ions will remain on the positive side of the beta alumina during charging of the battery while sodium ions migrate freely across the beta alumina. This is important since if aluminum ions could enter the beta alumina by exchange with sodium ions, the conductivity to sodium ions and the structural integrity of the beta alumina could be adversely affected.

Having explained my invention, I claim:

1. A battery comprising the combination of:
   (a) an anode comprising sodium;
   (b) a cathode comprising sulfur;
   (c) a solid member separating the anode and the cathode and capable of transmitting sodium ions; and,
   (d) an electrolyte on the cathode side of the solid member, the electrolyte being further described as
      (i) comprising sodium polysulfide, and a material selected from the group consisting of sulfides and polysulfides of aluminum, scandium, gallium, indium, bismuth and boron, the cations of which do no exchange with sodium ions in a solid member, and free sulfur when the anode and the cathode are in the charged condition, and
      (ii) having a melting point less than the melting point of $Na_2S_5$.

2. The battery of claim 1 in which the solid member separating the anode from the cathode is beta alumina and the electrolyte comprises sodium polysulfide and a material selected from the group consisting of aluminum sulfide and aluminum polysulfides.

3. The battery of claim 1 in which the battery is sealed with polytetrafluoroethylene and the electrolyte has a melting point which is lower than the upper operating temperature of the polytetrafluoroethylene.

4. The battery of claim 1 in which the electrolyte has a melting point not exceeding about 200° C.

5. The battery of claim 2 in which the battery is sealed with polytetrafluoroethylene and the electrolyte has a melting point which is lower than the upper operating temperature of the polytetrafluoroethylene.

6. The battery of claim 2 in which the electrolyte has a melting point not exceeding about 200° C.

7. The battery of claim 3 in which the electrolyte has a melting point not exceeding about 200° C.

References Cited

UNITED STATES PATENTS

| 3,404,035 | 10/1968 | Kummer et al. | 136—6 |
| 3,413,150 | 11/1968 | Kummer et al. | 136—6 |
| 3,679,480 | 7/1972 | Brown et al. | 136—6 |

ANTHONY SKAPARS, Primary Examiner

U.S. Cl. X.R.

136—83 T